United States Patent
Azuma et al.

(10) Patent No.: US 6,912,220 B2
(45) Date of Patent: Jun. 28, 2005

(54) ATM EQUIPMENT

(75) Inventors: Kazumasa Azuma, Koriyama (JP); Nobuyuki Endou, Koriyama (JP); Nobukatsu Takeda, Koriyama (JP)

(73) Assignee: Hitachi Telecom Technologies, Koriyama (JP)

( * ) Notice: Subject to any disclaimer, the term of this patent is extended or adjusted under 35 U.S.C. 154(b) by 786 days.

(21) Appl. No.: 09/777,928

(22) Filed: Feb. 7, 2001

(65) Prior Publication Data

US 2002/0024957 A1 Feb. 28, 2002

(30) Foreign Application Priority Data

Feb. 9, 2000 (JP) ........................................ 2000-031708

(51) Int. Cl.⁷ .............................................. H04L 12/56
(52) U.S. Cl. ................... 370/395.2; 370/395.6
(58) Field of Search ............................ 370/389, 351–4, 370/395.1, 395.2, 395.5, 395.6, 395.61, 395.62, 395.63, 395.64, 395.65, 400–2, 465–9, 474, 476

(56) References Cited

U.S. PATENT DOCUMENTS 6,141,339 A  * 10/2000 Kaplan et al. ......... 370/395.61
6,434,150 B1 *  8/2002 Bog et al. ................ 370/395.1
6,490,273 B1 * 12/2002 DeNap et al. .............. 370/352

* cited by examiner

*Primary Examiner*—David Vincent
(74) *Attorney, Agent, or Firm*—Foley & Lardner LLP

(57) ABSTRACT

The ATM equipment includes a voice circuit interfacing section connecting to voice devices, an interchange channel interfacing section connecting ATM lines, a cell composing and decomposing section celling voice signals from the voice circuit interfacing section and also decelling a cell received from the interchange channel interfacing section to produce voice signals, a SVC control section performing connecting/cutting control of a telephone call path in the ATM lines by a switch type virtual connection method, and a main control section connecting the interchange channel interfacing section to the voice circuit interfacing section when the voice devices are called in the case when the SVC control section performs the connecting and cutting control of the telephone call path in the ATM lines.

4 Claims, 5 Drawing Sheets

FIG.4

(1) SETUP

| PROTOCOL IDENTIFIER |
|---|
| CALL NUMBER |
| MESSAGE DESCRIPTION |
| MESSAGE LENGTH |
| AAL PARAMETER |
| AAL TRAFFIC DESCRIPTOR |
| BROADBAND TRANSMISSION CAPABILITY |
| ARRIVAL NUMBER |
| ARRIVAL SUBADDRESS |
| CONNECTION IDENTIFIER |
| QOS PARAMETER |

(2) CALLPROC

| PROTOCOL IDENTIFIER |
|---|
| CALL NUMBER |
| MESSAGE DESCRIPTION |
| MESSAGE LENGTH |
| CONNECTION IDENTIFIER |

(3) ALERT

| PROTOCOL IDENTIFIER |
|---|
| CALL NUMBER |
| MESSAGE DESCRIPTION |
| MESSAGE LENGTH |
| CONNECTION IDENTIFIER |
| ELAPSE IDENTIFIER |

FIG.5

(1) CONNECT

| PROTOCOL IDENTIFIER |
| CALL NUMBER |
| MESSAGE DESCRIPTION |
| MESSAGE LENGTH |
| CONNECTION IDENTIFIER |

(2) CONN-ACK

| PROTOCOL IDENTIFIER |
| CALL NUMBER |
| MESSAGE DESCRIPTION |
| MESSAGE LENGTH |

(3) RELEASE

| PROTOCOL IDENTIFIER |
| CALL NUMBER |
| MESSAGE DESCRIPTION |
| MESSAGE LENGTH |
| REASON DISPLAY |

(4) RELEASE-COMP

| PROTOCOL IDENTIFIER |
| CALL NUMBER |
| MESSAGE DESCRIPTION |
| MESSAGE LENGTH |
| REASON DISPLAY |

ATM EQUIPMENT

CROSS-REFERENCE TO RELATED APPLICATION

This application claims all benefits accruing 35 U.S.C. § 119 from the Japanese Patent Application No. 2000-31708, filed Feb. 9, 2000.

BACKGROUND OF THE INVENTION

1. Field of the Invention

The present invention relates to an ATM equipment connected to an ATM network through ATM lines and, more particularly, to an ATM equipment which performs connecting/cutting control of a telephone call path of telephone exchanges and voice terminals with a switch type virtual connection method (hereinafter referred to as "SVC method") and effectively makes good use of unused band by securing any band when needed, thereby causing the utilization efficiency of lines to be improved.

2. Description of Related Arts

User Network Interface 4.0 (hereinafter referred to as "UNI4.0") is defined in the ATM forum, and the SVC method has been achieved by using the ATM protocol in conformity to this UNI4.0.

However, the SVC method in conformity to the UNI4.0 defines signaling control corresponding to data communications as a main object, so that, when the method is used for voice communication, there was a problem in the delivery of audible signals in the signaling control process in its call establishment.

It is an object of the present invention to provide an ATM equipment which can deliver well a ringback signal (ringback tone: hereinafter referred to as "RBT"), a busy signal (busy tone: hereinafter referred to as "BT"), an announce signal and other audible signals sent out from a telephone exchange or a voice terminal of a destination side to a caller, in the process from calling to phone call, for a connection control in inter-work of the telephone exchange or voice terminal required for the signaling control of the voice communications.

BRIEF SUMMARY OF THE INVENTION

The present invention, in an ATM equipment comprising a voice circuit interfacing means connecting to voice devices, an interexchange channel interfacing means connecting ATM lines, a celling/decelling means celling voice signals from the voice circuit interfacing means to transfer the celled voice signals to the interexchange channel interfacing means and also decelling a cell received from the interexchange channel interfacing means to deliver the decelled cell to the voice circuit interfacing means, and a connection control means performing connecting/cutting control of a telephone call path in the ATM lines by a switch type virtual connection method, is characterized by comprising a call connecting means connecting the interexchange channel interfacing means to the voice circuit interfacing means when the voice devices are called in the case when the connection control means performs the connecting control of the telephone call path in the ATM lines, and wherein the celling/decelling means, when the call connecting means connects the interexchange channel interfacing means to the voice circuit interfacing means, decells the cell received by the interexchange channel interfacing means to produce voice signals and to deliver the voice signals to the voice circuit interfacing means.

BRIEF DESCRIPTION OF THE DRAWINGS

FIG. 4 is a diagram illustrating contents (information elements) of the message exchanged between the ATM equipment and the ATM network;

FIG. 5 is a diagram illustrating contents (information elements) of the message exchanged between the ATM equipment and the ATM network.

DETAILED DESCRIPTION OF THE INVENTION

The embodiment of the present invention now will be described in detail hereinafter with reference to the accompanying drawings.

Figure 1:
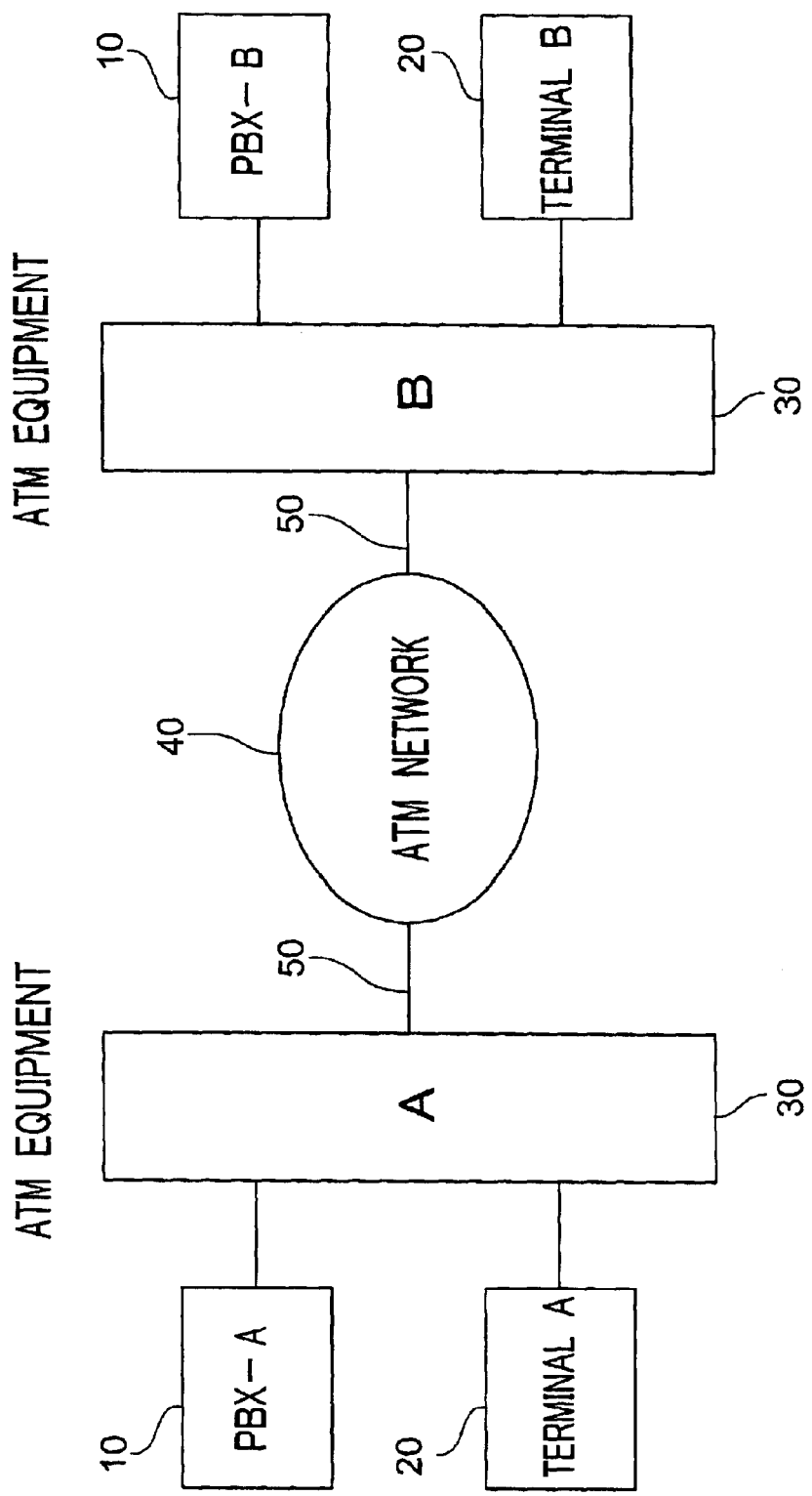
FIG. 1 is a schematic diagram of a communication system showing an embodiment according to the present invention.

FIG. 1 is a schematic diagram of a communication system showing the embodiment according to the present invention. The communication system, as shown in FIG. 1, is configured such that a plurality of ATM equipments accommodating one or more telephone exchanges 10 and/or voice terminals 20 are connected to an ATM network 40 through an ATM line 50.

In this case, the ATM equipments 30 receive call establishment signals and voice information from the telephone exchanges 10 and/or the voice terminals 20, make the signals and information to be ATM celled after adding number information required when the ATM equipments 30 are connected to the ATM network 40 to transmit the ATM cells (hereinafter referred to as "cell") to the ATM network 40, decell cells from the ATM network 40, and deliver the call establishment signals and voice information transmitted by the cells to the telephone exchanges 10 and/or the voice terminals 20.

An interface between the ATM network 40 and the ATM equipments 30 is the interface between use and network according to the ATM network, and for its voice signaling method, connection control for calls is performed in accordance with the signaling control (call establishment protocol) in conformity to the UNI4.0, so that the ATM equipments 30 allocates a telephone call path to a line of the ATM network 40 side. And, using the allocated telephone call path, one ATM equipment 30 can communicate to the other opposed ATM equipment 30 through the ATM network 40.

Incidentally, the interface between the telephone exchanges 10 and/or the voice terminals 20 and the ATM equipments 30 may be either the digital interface such as the ISDN basic interface defined by ITU-T or the primary rate of 1.544 Mb/s or 2.048 Mb/s, or the analog interface of the two-line loop dial (LD) method or four-line outband dial (OD) method. In the following description, an example in which the interface between the telephone exchanges 10 and/or the voice terminals 20 and the ATM equipments 30 is the analog interface of the outband dial (OD) method will be described.

Figure 2:
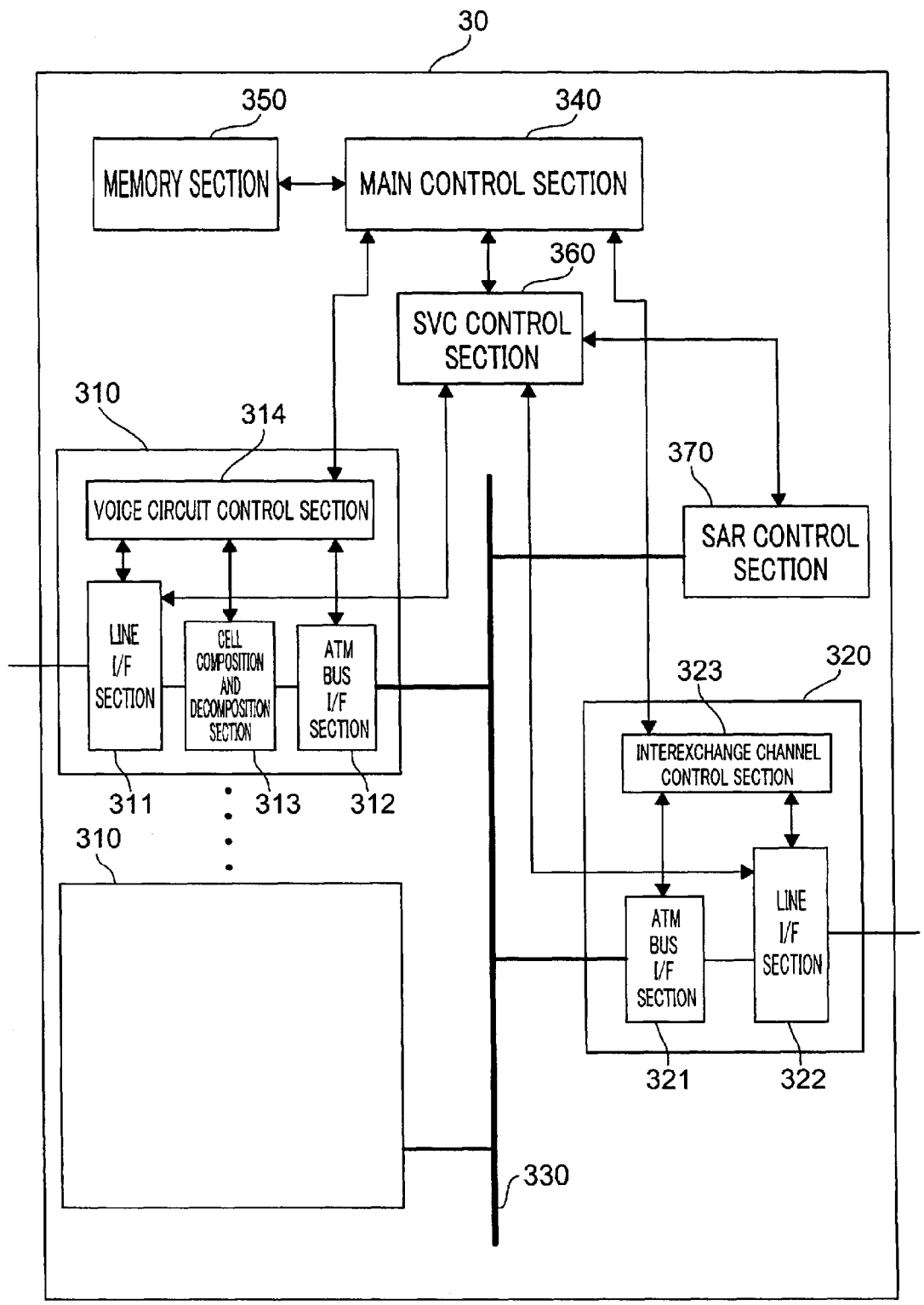
FIG. 2 is a block diagram showing the configuration of the ATM equipment according to the present invention.

FIG. 2 is a block diagram showing the configuration of the ATM equipment according to the present invention.

In FIG. 2, the ATM equipment 30 is composed of a voice circuit interfacing section 310 which interfaces with the telephone exchange 10 and/or the voice terminal 20 using either the digital interface such as the ISDN basic interface or the primary rate of 1.544 Mb/s or 2.048 Mb/s, or the analog interface of the two-line loop dial (LD) method or the four-line outband dial (OD) method, an interexchange channel interfacing section 320 which interlaces with the ATM network 40 through the ATM circuit 5 using an interfacing method according to the ATM network 40, an ATM bus 330 which connects the voice circuit interfacing section 310 and the interexchange channel interfacing section 320 to transmit and receive cells between the two interfacing sections, a main control section 340 which controls the whole of the ATM equipment 30, a memory section 350 which is connected to the main control section 340 and stores a process program for the main control section 340 to perform control operation, configuration information necessary for communication operation, or other control data, a SVC control section 360 which converts, when the voice circuit interfacing section 310 receives a transmission request signal and the SVC control section 360 receives a transmission information corresponding to the transmission request signal from the voice circuit interfacing section 310, the transmission request information into a message for signaling in conformity with the protocol on the ATM network 40, and a SAR control section 370 which makes, when it receives the message information from the SVC control section 360, the message information cells of the format of the ATM adaptation layer type 5 (hereinafter referred to as "AAL5") to deliver the cells to the corresponding interexchange channel interfacing section 320 through the ATM bus 330.

The voice circuit interfacing section 310 includes a line interfacing section 311 which interfaces with the telephone exchange 10 and/or the voice terminal 20, an ATM bus interfacing section 312 which interfaces with the ATM bus 330, a cell composing and decomposing section 313 which cells the voice signals from the line interfacing section 311 to deliver the celled voice signals to the ATM bus interfacing section 312, and decells the celled voice signals from the ATM bus interfacing section 312 to deliver them to the line interfacing section 311, and a voice line control section 314 which controls the whole of the voice circuit interfacing section 310 under the control of the main control section 340. Incidentally, the line interfacing section 311 is configured such that it is connected to the SVC control section 360, and when received the transmission request signal from the telephone exchange 10 and/or the voice terminal 20, it delivers the transmission request information corresponding to the transmission request signal to the SVC control section 360.

Further, the interexchange channel interfacing section 320 includes an ATM bus interfacing section 321 which interfaces with the ATM bus 330, a line interfacing section 322 which interfaces with the ATM network 40, and transfers the cells received by the ATM bus interfacing section 321 to the ATM network 40 and also delivers the cells received from the ATM network 40 to the ATM bus interfacing section 321, and an interexchange channel control section 323 which controls the whole of the interexchange channel interfacing section 320 under the control of the main control section 340. Incidentally, the interexchange channel control section 323 is delivered the configuration from the main control section 340, and the line interfacing section 322 sends the cells received by the ATM bus interfacing section 321 from the Segmentation Assembly and Reassembly (SAR) control section 370 through the ATM bus 330 to the ATM network 40 through the telephone cell path for signaling (call establishment) according to the cell multiplexing information included in the configuration information.

An example of the operations of such ATM equipment 30 will be described below in which a call is performed from the telephone exchange A (hereinafter referred to as "PBX-A") connected to the ATM equipment A to the telephone exchange B (hereinafter referred to as "PBX-B") connected to the ATM equipment B.

Figure 3:
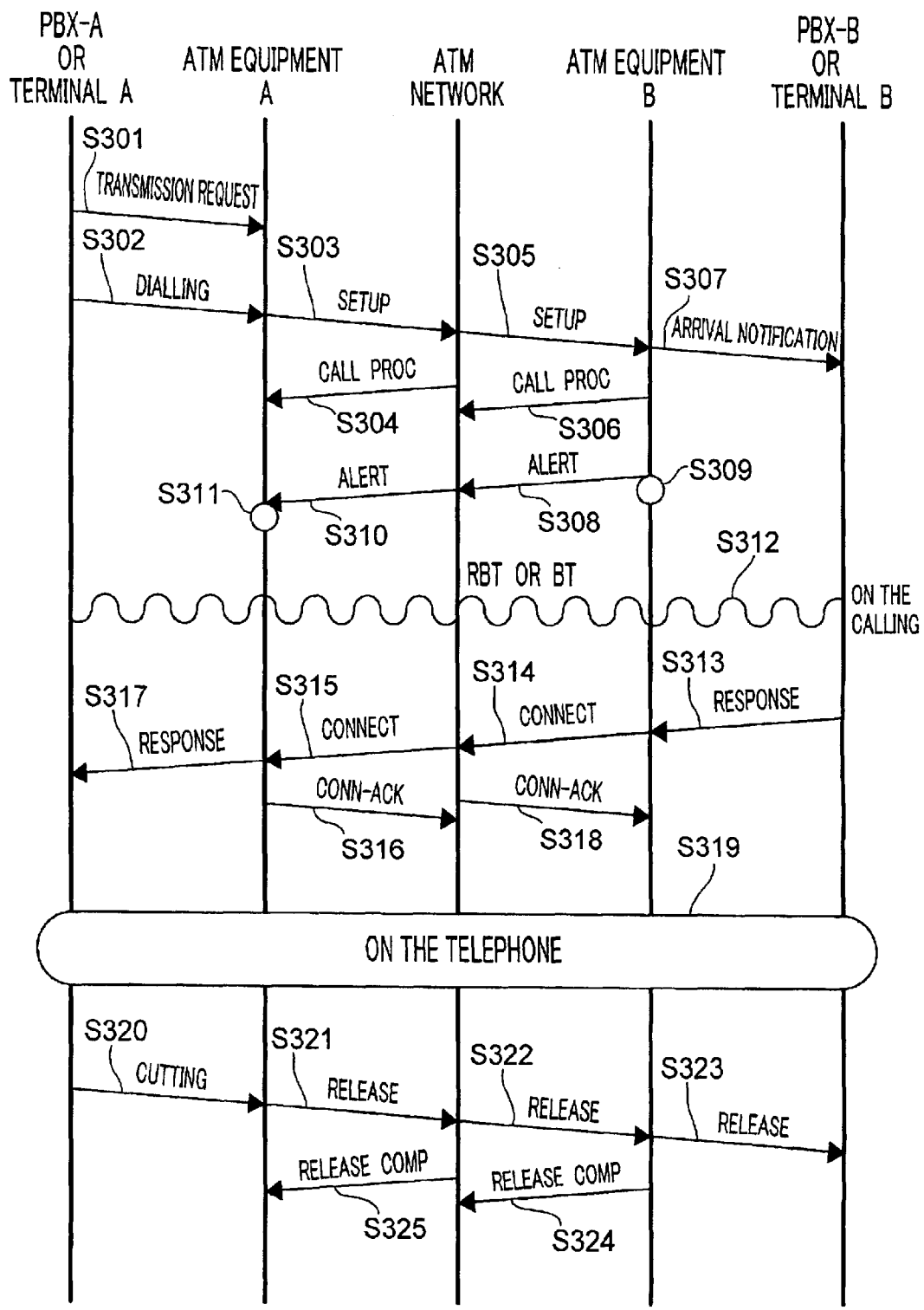
FIG. 3 is a connection sequence diagram illustrating the operation according to the present invention.

FIG. 3 is a connection sequence diagram in this case. Incidentally, FIGS. 4 and 5 are diagrams illustrating contents (information elements) of the messages exchanged between the ATM equipment A or ATM equipment B and the ATM network.

In FIG. 3, firstly, when the PBX-A issues a transmission request and the ATM equipment A receives the transmission request and a dial signal (S301, S302), the ATM equipment A detects these signals in the voice circuit interfacing section 310 and informs the SVC control section 360 as a transmission request information. Then, the SVC control section 360 converts the transmission request information to a call establishment message (SETUP), as shown in FIG. 4 (1), composed of information elements such as a protocol identifier, call number, message description, message length, AAL parameter, AAL traffic descriptor, broadband transmission capability, arrival number, arrival subaddress, connection identifier, and QoS parameter, and transmits the call establishment message to the SAR control section 370 which makes the received message cells. In the call establishment message, the information corresponding to the dial signal is stored in the arrival number for signaling adapted to the protocol on the ATM network 40.

The SAR control section 370 makes the received message to cells of an AAL5 to deliver the cells to the ATM bus 330, and the corresponding interexchange channel interfacing section 320 receives the cells. Then, the interexchange channel interfacing section 320 makes the cells received from the SAR control section 370 cell-multiplexed according to the cell multiplexing information included in the configuration information delivered from the main control section 340, and sends the multiplexed cells to the ATM network 40 through the telephone call path for signaling (call establishment) as the call establishment message (SETUP) (S303). In this case, the address information showing the PBX-B along with other information such as the information transferring capacity and user speed are included to the call establishment message (SETUP).

After receiving the message, the ATM network 40 replies a call establishment acceptance message (CALLPROC) composed of a protocol identifier, call number, message description, message length and connection identifier, shown in FIG. 4 (2), to the ATM equipment A (S304), and at the same time, sends out the call establishment message to the ATM equipment B (S305).

On the other hand, in the ATM equipment B, the call establishment message (SETUP) received by the interexchange channel interfacing section 320 is transferred to the SAR control section 370 through the ATM bus 330, and decelled in this SAR control section 370 to be sent out to the SVC control section 360. When receiving the decelled message, the SVC control section 360 processes the decelled message according to the protocol compliant with the UNI4.0 by confirming the consistency based on the information elements included in it, and transmits the call establishment acceptance message (CALLPROC) to the SAR control section 370.

The SAR control section 370, then, makes the received message cell of AAL5 to send it out to the ATM bus 330, and the corresponding interexchange channel interfacing section 320 receives the cell. Then, the interexchange channel interfacing section 320 makes the cell received from the SAR control section 370 cell-multiplexed to send the multiplexed cell to the ATM network 40 through the telephone call path for signaling as the call establishment acceptance message (CALLPROC) (S306). In addition, when analyzing the contents of the information received from the SVC control section 360, the main control section 340 recognizes the arrival to the PBX-B to inform the corresponding voice circuit interfacing section 310 of the arrival. Thereby, the voice circuit interfacing section 310 recognizes that the arrival to the line to which it is connected has been performed and delivers an arrival signal to the PBX-B (S307).

At this time, The main control section 340 of the ATM equipment B acquires a pass information to be connected according to the connection identifier included in its call establishment acceptance message (CALLPROC), and reserves a pass establishment to be used to call the voice circuit interfacing section 310 to which the PBX-B is connected and the interexchange channel interfacing section 320.

In addition, in the ATM equipment B, after sending out the arrival signal to the PBX-B and delivering the call establishment acceptance message (CALLPROC) to the ATM network 40, the SVC control section 360 sends out a calling message (ALERT) composed of a protocol identifier, call number, message description, message length, connection identifier and elapse identifier, shown in FIG. 4 (3), to the SAR control section 370. Then, similarly, the SAR control section 370 makes the received message cell of AAL5 to send it out to the ATM bus 330 and delivers it to the ATM network 40 as the calling message (ALERT) through the corresponding interexchange channel interfacing section 320 and the telephone call path for signaling (S308).

Further, at this time, the main control section 340 of the ATM equipment B performs the pass establishment to be used for the previously reserved call according to the elapse information identifier included in its calling message (ALERT) to connect the voice circuit interfacing section 310 to which the PBX-B is connected and the interexchange channel interfacing section 320, enabling the cells in which the voice signals were stored to be transferred between them (S309).

On the other hand, in the ATM equipment A, the call establishment acceptance message (CALLPROC) received by the interexchange channel interfacing section 320 is transferred to the SAR control section 370 through the ATM bus 330, and decelled in this SAR control section 370 to be sent out to the SVC control section 360. When receiving the decelled message, the SVC control section 360 processes the decelled message according to the protocol compliant with the UNI4.0 by confirming the consistency based on the information elements included in it.

At this time, the main control section 340 of the ATM equipment A acquires the pass information to be connected according to the connection identifier included in its call establishment acceptance message (CALLPROC), and reserves the pass establishment to be used to call the voice circuit interfacing section 310 to which the PBX-A is connected and the interexchange channel interfacing section 320.

Thereafter, when receiving the calling message (ALERT) from the ATM network 40 (S310), the interexchange channel interfacing section 320 transfers the message to the SAR control section 370 through the ATM bus 330. The calling message (ALERT) is decelled in this SAR control section 370 to be sent out to the SVC control section 360. Then, the SVC control section 360 similarly processes the decelled message according to the protocol compliant with the UNI4.0.

Then, at this time, the main control section 340 of the ATM equipment A performs the pass establishment to be used for the previously reserved call according to the elapse information identifier included in its calling message (ALERT) to connect the voice circuit interfacing section 310 to which the PBX-A is connected and the interexchange channel interfacing section 320, enabling the cells in which the voice signals were stored to be transferred between them (S311).

In this way, transfer of the voice signals between the PBX-A and the PBX-B is made possible, so that the PBX-A (a telephone connected to the PBX-A) is allowed to listen to the RBT or BT transmitted by the PBX-B (S312).

That is, in the ATM equipment B, when the voice circuit interfacing section 310 receives the RBT from the PBX-B, a header of the ATM equipment A noticed by the call establishment message (SETUP) is added to the RBT in the cell composing and decomposing section 313 and the RBT is generated as a cell to be transferred to the ATM network 40 through the interexchange channel interfacing section 320. On the other hand, when receiving the cell transmitted from the ATM network 40 in the voice circuit interfacing section 310 through the interexchange channel interfacing section 320 and the ATM bus 330, the ATM equipment A decells the cell in the cell composing and decomposing section 313 to send it out to the PBX-A as the RBT.

Thereafter, when a telephone connected to the PBX-B responds to the arrival signal and the PBX-B delivers a response signal (S313), the voice circuit interfacing section 310 of the ATM equipment B recognizes the response signal to inform the SVC control section 360 of the arrival. Then, the SVC control section 360, according to the protocol compliant with the UNI4.0, sends out a response message (CONNECT) composed of a protocol identifier, call number, message description, message length, and connection identifier, shown in FIG. 5 (1). The SAR control section 370 makes the received message cell of AAL5 to send it out to the ATM bus 330 and delivers it to the ATM network 40 as the response message (CONNECT) through the corresponding interexchange channel interfacing section 320 and the telephone call path for signaling (S314).

On the contrary, the ATM network 40 replies a response acknowledge message (CONN-ACK) composed of a protocol identifier, call number, message description, and message length, shown in FIG. 5 (2), to the ATM equipment B, and also sends out the response message (CONNECT) to the ATM equipment A (S315).

On the other hand, in the ATM equipment A, the response message (CONNECT) received by the interexchange channel interfacing section 320 is transferred to the SAR control section 370 through the ATM bus 330, and decelled in this SAR control section 370 to be sent out to the SVC control section 360. When receiving the decelled message, the SVC control section 360 processes the decelled message according to the protocol compliant with the UNI4.0 by confirming the consistency based on the information elements included in it, and transmits the response acknowledge message (CONN-ACK) to the SAR control section 370.

The SAR control section 370, then, makes the received message cell of AAL5 to send it out to the ATM bus 330, and the corresponding interexchange channel interfacing section 320 receives the cell. The interexchange channel interfacing section 320 makes the cell received from the SAR control section 370 cell-multiplexed to send the multiplexed cell to the ATM network 40 through the telephone call path for signaling as the response acknowledgement message (CONN-ACK) (S316). In addition, when analyzing the contents of the information received from the SVC control section 360, the main control section 340 recognizes the arrival to the PBX-A to inform the corresponding voice circuit interfacing section 310 of the arrival. Thereby, the voice circuit interfacing section 310 recognizes that the response to the line to which it is connected has been performed and delivers a response signal to the PBX-A (S317).

Further, the ATM equipment A proceeds to a calling state so that the cell related to the call can be transmitted and received through the ATM bus 330 between the interexchange channel interfacing section 320 accommodating the corresponding line of the ATM network 40 and the voice circuit interfacing section 310 accommodating the PBX-A.

In the ATM equipment B, when the ATM network 40 delivers the response acknowledge message (CONN-ACK) (S318) and the message is received by the interexchange channel interfacing section 320, the message is transferred to the SAR control section 370 through the ATM bus 330, and decelled in this SAR control section 370 to be sent out to the SVC control section 360. And, when receiving the decelled message, the SVC control section 360 processes the decelled message according to the protocol compliant with the UNI4.0 by confirming the consistency based on the information elements included in it. In addition, after analyzing the contents of the information received from the SVC control section 360, the main control section 340 causes the state of the ATM equipment A to proceed to the calling state so that the cell related to the call can be transmitted and received through the ATM bus 330 between the interexchange channel interfacing section 320 accommodating the corresponding line of the ATM network 40 and the voice circuit interfacing section 310 accommodating the PBX-A.

As will be apparent from the foregoing descriptions, call between the PBX-A and the PBX-B is made possible through the ATM equipment A, the ATM network 40 and the ATM equipment B (S319).

Then, when the desired call thus connected between the PBX-A and the PBX-B is completed, the call will be cut off by sending a cutting signal.

In the case where cutting operation is performed from the PBX-A side, when a telephone accommodated in the PBX-A is cut by on-hook, then the PBX-A sends a cutting signal to the ATM equipment A (S320). Hereinafter, similar to the delivery of the call establishment message (SETUP) previously explained, a release message (RELEASE) composed of a protocol identifier, call number, message description, message length and reason display, shown in FIG. 5 (3), is send out sequentially to the ATM network 40 and the ATM equipment B (S321, S322). Also, when the ATM equipment B receives the release message (RELEASE), it returns a release signal to the PBX-B (S323). Then, the PBX-B recognizes cutting of the call, and performs a cutting process such as delivering BT to the telephone that is accommodated in the PBX-B and was on the phone. Further, the ATM network 40 and the ATM equipment B which received the release message (RELEASE) deliver a release completion message (RELEASE-COMP) composed of a protocol identifier, call number, message description, message length and reason display, shown in FIG. 5 (4), to the originating transmitter of the release message (RELEASE) (S324, S325).

In such a way, the communication based on the SVC connection between the PBX-A and the PBX-B is cut, and the resources of the communication path and each of the interfacing sections used in this communication will be released.

As discussed above, the present invention relates to connection control in the inter-work of the telephone exchange or voice terminal required for the signaling control of the voice communications on the ATM network or the ATM lines, and can deliver well a ringback signal, a busy signal, an announce signal and other audible signals sent out from a telephone exchange or a voice terminal of a destination side to a caller, in the process from calling to phone call.

What is claimed is:

1. An ATM equipment comprising a voice circuit interfacing means connecting to voice devices, en interexchange channel interfacing means connecting ATM lines, a celling/decelling means for converting voice signals output from said voice circuit interface means into cells and delivering the cells to said interexchange circuit interface means, and for decelling cells output from said interexchange circuit interface means to generate voice signals and delivering the voice signals to said voice circuit interface means, and a connection control means performing connecting/cutting control of a telephone call path in said ATM lines by a switch type virtual connection method, the ATM equipment further comprising:

a call connecting means connecting said interexchange channel interfacing means to said voice circuit interfacing means when said voice devices are called in the case when said connection control means performs the connecting control of said telephone call path in said ATM lines, and wherein said celling/decelling means, when said call connecting means connects said interexchange channel interfacing means to said voice circuit interfacing means, decells cells containing audible signals for voice communication that said interexchange circuit interface means received from said ATM circuit to deliver the audible signals for voice communication to said voice circuit interface means starting at a moment when one of said voice devices is changed from a calling state to a talking state.

2. The ATM equipment according to claim 1, wherein said call connecting means, when delivering a calling message in the connection protocol of said switch type virtual connection method, connects said interexchange channel interfacing means to said voice circuit interfacing means.

3. The ATM equipment according to claim 1, wherein said call connecting means, when receiving a calling message in the connection protocol of said switch type virtual connection method, connects said interexchange channel interfacing means to said voice circuit interfacing means.

4. The ATM equipment according to claim 1, further comprising:

a memory for storing cells corresponding to voice signals, prior to the voice device changing over from calling state to the talking state, wherein the stored cells are sent over the ATM lines when the voice device changes over to the talking state.

* * * * *